United States Patent [19]

Nalley

[11] 4,351,112

[45] Sep. 28, 1982

[54] SABRE SAW BAR AND BLADE HOLDER

[75] Inventor: David J. Nalley, Liberty, S.C.

[73] Assignee: The Singer Company, Stamford, Conn.

[21] Appl. No.: 236,417

[22] Filed: Feb. 20, 1981

[51] Int. Cl.³ .............................................. B27B 19/02
[52] U.S. Cl. ......................................... 30/392; 279/83
[58] Field of Search ......................... 30/392, 393, 394; 279/83, 76

[56] References Cited

U.S. PATENT DOCUMENTS

| 2,735,685 | 2/1956 | Karr | 30/392 X |
|---|---|---|---|
| 3,186,726 | 6/1965 | Wilhelm | 279/83 |
| 3,412,767 | 11/1968 | Green | 30/392 |
| 3,738,003 | 6/1973 | Dietzen | 30/392 |
| 4,083,112 | 4/1978 | Palm | 30/392 X |
| 4,262,420 | 4/1981 | Nalley | 30/392 |

Primary Examiner—Jimmy C. Peters
Attorney, Agent, or Firm—Robert E. Smith; Edward L. Bell

[57] ABSTRACT

In accordance with the present invention a motorized sabre saw for reciprocating an elongated saw blade, or the like, is provided with a saw bar and blade holder or chuck combination wherein an end portion of the saw bar is of generally circular cylindrical configuration having a longitudinally extending groove therein having a first wall spaced apart from a radius of the bar a distance substantially equal to one-half the thickness of the blade to be driven thereby and generally parallel such radius and a second wall generally perpendicular the first wall extending from the first wall across such radius with the first and second walls defining therebetween a generally square shoulder whereby a blade clamped thereagainst will be generally bisected by such radius, together with a clamp block mounted with the saw bar over at least a portion of such groove and having a first generally cylindrical aperture a major portion of which is generally circular and complementary to the end portion of the saw bar and the remaining portion of the aperture comprising a generally rectangular groove, one wall of which is disposed in general alignment with the first wall of the saw bar and the possible wall of the rectangular groove intersects the second wall of the saw bar generally perpendicular thereto with said one wall and said other wall being spaced apart a distance at least the thickness of the blade shank, together with first fastening means securing the clamp block with the saw bar and second fastening means replaceably securing the saw blade, or the like, within the aperture. The saw bar and the second fastening means are preferably fabricated with material such as steel which is capable of supporting the stresses induced by the reciprocating saw blade or the clamp block may be fabricated of a much lighter weight, loss mass material, such as a magnesium.

8 Claims, 4 Drawing Figures

U.S. Patent  Sep. 28, 1982  4,351,112
Fig. 1
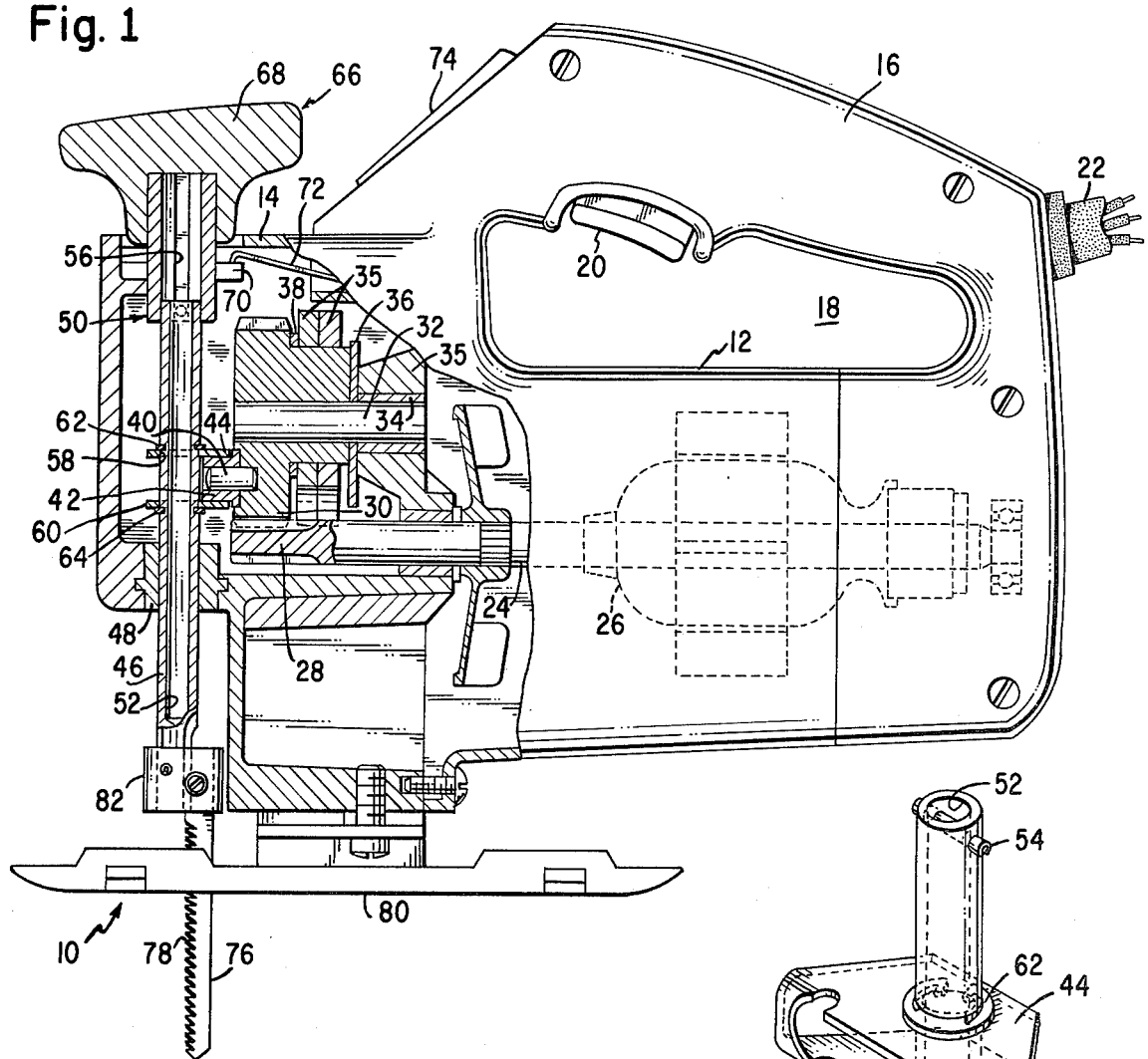
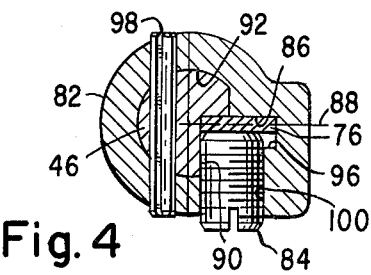
Fig. 4
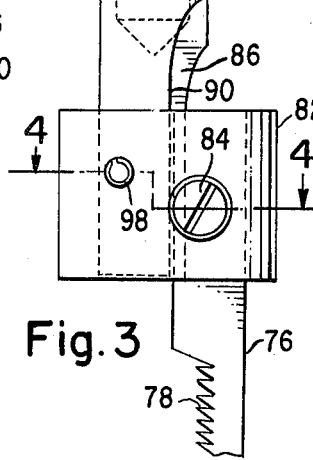
Fig. 3
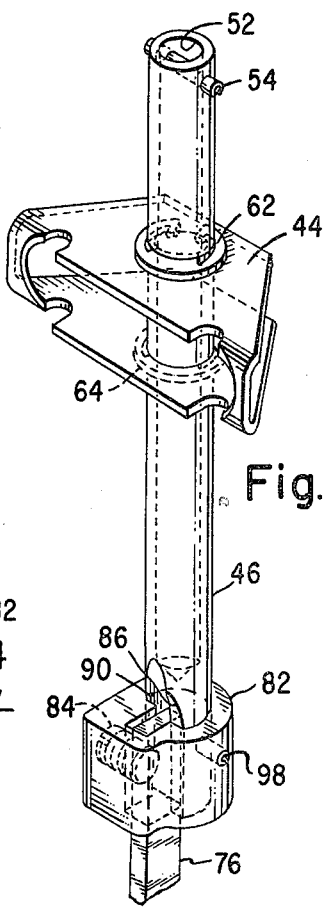
Fig. 2

SABRE SAW BAR AND BLADE HOLDER

FIELD OF THE INVENTION

This invention relates to motorized sabre saws and, more particularly, to a novel and improved lightweight, low mass saw bar and blade holder or chuck assembly and to sabre saws incorporating same.

BACKGROUND OF THE INVENTION

Sabre saws and especially general purpose electrically driven sabre saws for use by craftsmen and handymen have become popular and versatile tools for cutting wood, light sheet metal, plastic, composition board, and the like. Such saws are known comprising a generally cylindrical housing containing a built-in electric motor which drives a reduction gear train to rotate an eccentric crank pin which in turn is operatively associated with a crosshead mounted for movement with an elongated saw bar in turn journalled for reciprocatory movement generally perpendicular the motor axis. Because the reciprocation of the saw bar and crosshead provides a rapidly varying load to the motor and substantial vibration, various schemes have been devised and attempted to reduce vibration and load variation associated with the reciprocation of the saw bar.

In copending applications Ser. Nos. 103,662, filed Dec. 14, 1979 and 137,928 filed Apr. 7, 1980, assigned to the assignee of the instant application, and hereby incorporated herein by reference, as fully and completely as if reproduced hereat, various aspects of reduced mass saw bar and crosshead designs are disclosed which have been effective to reduce the mass and, therefore, the vibration and shock loading accompanying the reversal of movement of the saw bar. The instant application is directed towards a saw bar and blade holder or chuck assembly which yet further reduces the mass to be reciprocated and which enables the use of a light weight, low mass material such as magnesium as a substantial component of the blade holder or chuck assembly while yet enabling a saw blade, or the like, to be rigidly clamped substantially entirely by steel or steel-like components.

OBJECTS OF THE INVENTION

Bearing in mind the foregoing, it is a primary object of the present invention to provide novel and improved sabre saws incorporating a saw bar and saw blade, or the like, inlcucing a clamping assembly of low mass that is yet sufficiently strong, tough, and rigid as to operate satisfactorily over long periods of time.

Another primary object of the present invention, in addition to each of the foregoing objects, is the provision in a sabre saw of a novel and improved saw bar and blade holder or chuck assembly of minimal mass which is yet sufficiently strong, rigid, and tough as to be durable and effective in use over a long period of time.

Yet another primary object of the present invention, in addition to each of the foregoing objects, is the provision of novel and improved sabre saws incorporating novel and improved saw bars and saw blade, or the like, holders or chucks of substantially lightweight, low mass material, such as magnesium.

Yet still another primary object of the present invention, in addition to each of the foregoing objects, is the provision of an improved blade holder or chuck device for sabre saws, or the like, which is simple, economical and reliable, which provides a positive mechanical connection between the saw bar, blade holder or chuck device, and saw blade or the like.

Yet another and still further primary object of the present invention, in addition to each of the foregoing objects, is the provision of novel and improved sabre saws, saw bars and blade holder devices therefore, which enables the saw blade or the like, to be firmly clamped against the lower end portion of the saw bar and which enables the reciprotary and other cutting forces to be substantially entirely born by the lower end portion of the saw bar.

A still further primary object of the present invention, in addition to each of the foregoing objects, is the provision of novel and improved sabre saw, saw bars and blade holder assemblies therefore, which enables the saw blade, or the like, to be connected thereto offset from the axis of the saw bar, enabling the saw bar to be automatically rotated thereby to provide an automatic scroller action for cutting curves, especially compound curves.

It is yet another and still further primary object of the present invention, in addition to each of the foregoing objects, to provide novel and improved sabre saws of increased efficiency, exhibiting reduced vibration.

A yet further primary object of the present invention, in addition to each of the foregoing objects, is the provision of novel and improved sabre saws, saw bar assemblies, and chuck or blade holder devices therefore, which are of low mass yet hold or clamp the blade or the like offset behind the saw bar axis while selectively permitting free rotation thereof, to enable auto-scroller action for cutting compound curved cuts.

The invention resides in the combination, construction, arrangement and disposition of the various component parts and elements incorporated in improved sabre saws, and the like, and in saw bars and blade holders or chucks therefore in accordance with the principles of this invention. The present invention will be better understood and objects and important features other than those specifically enumerated above will become apparent when consideration is given to the following details and description which, when taken in conjunction with the annexed drawing describes, discloses, illustrates and shows a preferred embodiment or modification of the present invention and what is presently considered and believed to be the best mode of practicing the principles thereof. Other embodiments or modifications may be suggested to those having the benefit of the teachings herein, and such other embodiments or modifications are intended to be reserved, especially if they fall within the scope and spirit of the subjoined claims.

SUMMARY OF THE INVENTION

In accordance with the present invention a motorized sabre saw for reciprocating an elongated saw blade, or the like, is provided with a saw bar and blade holder or chuck combination wherein an end portion of the saw bar is of generally circular cylindrical configuration having a longitudinally extending groove therein having a first wall spaced apart from a radius of the bar a distance substantially equal to one-half the thickness of the blade to be driven thereby and generally parallel such radius and a second wall generally perpendicular the first wall extending from the first wall across such radius and offset behind the axis of the saw bar with the first and second walls defining therebetween a generally square shoulder whereby a blade clamped thereagainst will be generally bisected by such radius, together with a clamp block mounted with the saw bar over at least a portion of such groove and having a first generally cylindrical aperture a major portion of which is generally circular and complementary to the end portion of the saw bar and the remaining portion of the aperture comprising a generally rectangular groove, one wall of which is disposed in a general alignment with the first wall of the saw bar and the opposite wall of the rectangular groove intersects the second wall of the saw bar generally perpendicular thereto with said one wall and said other wall being spaced apart so as to be complementary the blade shank, together with first fastening means securing the clamp block with the saw bar and second fastening means replaceably securing the saw blade, or the like, within the aperture. The saw bar and the second fastening means are preferably fabricated of material such as steel which is capable of supporting the stresses induced by the reciprocating saw blade and the clamp block may be fabricated of a much lighter weight, low mass material, such as a magnesium.

DESCRIPTION OF THE DRAWING

While the specification concludes with claims particularly pointing out and distinctly claiming the subject matter which is regarded as forming the present invention, it is believed the invention will be better understood from the following detailed description when taken in conjunction with the annexed drawing which discloses, illustrates and shows a preferred embodiment or modification of the present invention and what is presently considered and believed to be the best mode of practicing the principles thereof and wherein:

FIG. 1 is a side elevational view, partially broken away, of a sabre saw incorporating a saw bar and blade chuck or holder assembly in accordance with the present invention;

FIG. 2 is an enlarged isometric illustration of the saw bar, crosshead and blade chuck assembly of the sabre saw of FIG. 1;

FIG. 3 is a yet further enlarged elevational illustration of the lower end portion of the saw bar and saw blade chuck or clamp block of the preceeding figures; and FIG. 4 is a cross-sectional illustration through the lower end portion of the saw bar and blade chuck or clamp block of the preceeding figures taken along line 4—4 of FIG. 3.

DETAILED DESCRIPTION OF THE INVENTION

With reference now to the drawing, there is shown and illustrated therein a novel and improved sabre saw constructed in accordance with the principles of the present invention and designated generally by the reference character 10.

The sabre saw 10 comprises a motor housing portion 12, a front or drive housing portion 14 and a handle portion 16 of integral construction and defining a hand grip opening 18 generally beneath the handle portion 16 which, as shown, extends generally above the motor housing portion 12. Within the handle portion 16 and extending downwardly into the hand grip portion 18 is a trigger switch control 20 which, as will be appreciated by those having skill in the art, may be an ON/OFF switch or variable speed control switch and which, when squeezed by an operator's forefinger, is effective to operate the sabre saw 10. Also extending from the rear of the handle housing portion 16 is a power cord 22.

A shaft 24 of a driving electric motor indicated generally by the reference character 26 and mounted within the motor housing 12 extends into the front housing portion 14 and is formed with a splined portion 28. The splined portion 28 meshes with and drives a gear 30 fast on a stub shaft 32 journalled, as by means of a bearing 34 mounted within the front housing portion 14 as in a boss 35 and separated therefrom, as by a thrust washer 36. The gear 30 is integrally formed with an eccentric crank 33 which carries one or more, for example, two, eccentrically mounted counter weights 35, separated from the gear teeth, as by a thrust washer 38 and slidably retained against rotation, as by guide pins (not shown) also mounted with the housing. The gear 30 also carries an eccentric pin 40 180° out of phase with the counter balance eccentric 33 and weights 35. The eccentric pin 40 is in turn surrounded by a roller 42 which engages a crosshead 44, perforated and formed as more particularly pointed out in the aforesaid copending application Ser. No. 103,662 filed Dec. 14, 1979, Pat. No. 4,262,420 and defining with the eccentric pin 40 and roller 42, a scotch yoke mechanism.

The crosshead 44 is mounted for reciprocating movement with a generally tubular saw bar 46 which extends therethrough. The saw bar 46 is free to turn about its axis, being journalled for linear movement a sleeve bearing 48 secured in the bottom portion of the front housing portion 14 and a journal bushing 50 secured in the top of the front housing portion 14 and rotatable therein. The saw bar 46, as pointed out above, is generally tubular, being provided with a longitudinally extensive central bore 52 so as to minimize the mass and inertia thereof. The lower end portion thereof, as will be detailed more thoroughly hereafter is of generally solid construction.

Upon operation of the sabre saw, the motor shaft 24 will drive the gear 30 which, through pin 40 and roller 42 working in the crosshead 44, transmits linear axial reciprocatory motion to the saw bar 46. A pin 54 is secured to the upper end portion of the saw bar 46 in sliding engagement with longitudinal slots 56 provided in the upper bushing 50. The saw bar is also free to turn about its axis within holes 58 and 60 provided in the crosshead 44, but is held longitudinally captive by a pair of annular clinch rings or snap rings 62 and 64, respectively, disposed above and below the crosshead 44 and engaged within annular grooves provided above and below the crosshead 44 on the saw bar 46. As will be appreciated, the rings 62 and 64 comprise a very low mass means for retaining the crosshead 44 and the saw bar 46 together.

Means, in the form of a control knob assembly designated generally by the reference character 66, is provided for selectively and manually controlling the angular position of the saw bar 46 while it is reciprocating. The control knob assembly 66 includes the journal bushing 50 to which is affixed a control knob 68, as by means of a set screw, not shown. The sabre saw further comprises means for selectively locking and unlocking the control assembly 66 and the saw bar 46 against rotation or to permit free rotation thereof and may comprise, for example, an annular collar 70 extending radially outwardly of the bushing 50 generally coaxial thereto and provided with a plurality, such as four, axial peripheral slots perpendicular the pin 54 for selective engagement and disengagement with a latch comprising, for example, a leaf spring 72 cantelevered from the housing and controlled by means of a trigger slide 74, all as described in more detail in my copending application Ser. No. 137,928 filed Apr. 7, 1980, now U.S. Pat. No. 4,283,855 and incorporated herein by reference as fully and completely as if reproduced hereat.

The lower end portion of the saw bar 46, as hereinbefore pointed out, is preferably of generally solid construction to provide solid steel mounting surfaces to which can be affixed a saw blade 76 having a series of cutting teeth 78 defining a cutting edge and driven by the reciprocatory movement of the saw bar 46 in a linear reciprocatory path substantially normal to the plane of a work contacting shoe 80. Mounted to and cooperating with the lower end portion of the saw bar 46 to hold the blade 76 in position, is a blade chuck member 82 which is provided with a blade clamp screw 84 which is preferably of a hardened material such as steel or material having the characteristics of steel. Hence, the saw blade 76 is retained between the steel set screw or clamp screw 74 and the lower end portion of the steel saw bar 46. The blade 76 is offset behind the rotational axis of the saw bar 46 so that when the control assembly 66 is unlocked so that the saw bar 46 is free to rotate, the saw blade 76 will automatically rotate to follow the direction in which the operator pushes the tool, a phenomenon conventionally designated as autoscroller action.

As is heretofore pointed out, it is desirable that the reciprotary assembly comprising the saw bar 46, blade 76, blade clamp or chuck 82 and crosshead 44 be of minimal mass. Accordingly, since the saw blade 76, in accordance with the present invention, is clamped between the steel set or clamp screw 84 and the lower end portion of the steel saw bar 46, the blade clamp 82 may be manufactured of a substantially lighter material, and need not have the strength, hardness and creep resistance of steel. Hence, the blade clamp 82 may be fabricated of a material having, for example, the characteristics of magnesium, notably low density and low mass.

As shown, the lower end portion of the saw bar 46 is of generally circular cylindrical configuration having a longitudinally extending groove therein defined by a first wall spaced apart from a radius, indicated by the reference character 88, of the saw bar 46 a distance substantially equal to one-half of the thickness of the blade 76 and generally parallel the radius 88 and by a second wall 90 generally perpendicular the first wall 86 and extending from the first wall 86 across the radius 88. The first wall 86 and the second wall 90 define therebetween a generally square shoulder whereby the blade 76 clamped thereagainst will be generally bisected by the radius 88. The blade clamp 82 is mounted with the saw bar 46 over at least a portion of the groove or shoulder defined by the walls 86 and 90. The clamp block 82 has a first generally cylindrical aperture 92 extending therethrough, major portion of which is of generally circular configuration complementary the lower end portion of the saw bar 46. The remaining portion of the first aperture 92 comprises a generally rectangular groove, one wall 94 of which is disposed in general alignment with the wall 86 of the saw bar 46. The opposite wall 96 of the clamp block 82 intersects the second wall 90 of the saw bar 46 generally perpendicular thereto and the walls 94 and 96 of the clamp block 82 are generally parallel and spaced apart a distance at least the thickness of the shank of the blade 76. First fastening means, such as a pin 98 secures the clamp block 82 with the saw bar 46. The set screw 84 defines second fastening means associated with the clamp block 82 and replaceably secures the saw blade 76 within the aperture. It will be realized that other tool accessories, such as files, knife blades, or the like, could be utilized in the place and stead of the illustrated saw blade 76. The set screw 84 is associated with the clamp block 82 by being threaded into a transverse threaded aperture 100 in the clamp block 82 intersecting the rectangular groove opposite of the first wall 86 of the saw bar 46 at the wall 94 of the clamp block 82.

While the invention has been described, disclosed, illustrated and shown in terms of a preferred embodiment or modification which it has assumed in practice, it is to be expressely understood that this has been done for purposes of example only and that the invention is not intended to be deemed to be limited thereby, that other embodiments or modifications that may be suggested to those having the benefit of the teachings herein are intended to be reserved especially as they fall within the scope and the spirit of the claims here appended.

I claim:

1. In a motorized sabre saw for reciprocating an elongated saw blade, or the like, a saw bar and blade chuck combination wherein an end portion of the saw bar is of generally circular cylindrical configuration having a longitudinally extending groove therein, said groove having a first wall spaced apart from a radius of the bar a distance substantially equal to one-half the thickness of the blade to be driven thereby and generally parallel such radius, and a second wall generally perpendicular said first wall extending from said first wall across such radius, said first and second walls defining therebetween a generally square shoulder whereby a blade clamped thereagainst will be generally bisected by such radius, together with a clamp block mounted with said saw bar over at least a portion of said groove, said clamp block having a first generally cylindrical aperture therethrough, a major portion of said aperture being generally circular and complementary to said end portion of said saw bar, the remaining portion of said aperture comprising a generally rectangular groove, one wall of which is disposed in general alignment with said first wall of said saw bar, the opposite wall of said rectangular groove intersecting said second wall of said saw bar generally perpendicular thereto, said one wall and said other wall being spaced apart a distance at least the thickness of the blade shank, together with first and second fastening means, said first fastening means securing said clamp block with said saw bar and said second fastening means replaceably securing a saw blade, or the like, within said aperture.

2. Motorized sabre saw as defined in claim 1 wherein said saw bar is fabricated of a hard material having the characteristics of steel, said clamp block is fabricated of a light material having the characteristics of magnesium, and said blade clamping means comprises a transverse threaded aperture in said clamping means intersecting said rectangular groove opposite said first wall of said saw bar groove and a set screw threaded therein whereby the saw blade is clamped between said first wall, said second wall, and said set screw.

3. Motorized sabre saw defined in claim 2 wherein said clamp block fastening means comprises a transverse press fit pin.

4. Motorized sabre saw defined in claim 3 wherein said saw bar is substantially hollow and of low mass.

5. Saw bar and blade chuck for a motorized sabre saw for reciprocating an elongated saw blade, or the like, wherein an end portion of the saw bar is of generally circular cylindrical configuration having a longitudinally extending groove therein, said groove having a first wall spaced apart from a radius of the bar a distance substantially equal to one-half the thickness of the blade to be driven thereby and generally parallel such radius, and a second wall generally perpendicular said first wall extending from said first wall across such radius, said first and second walls defining therebetween a generally square shoulder whereby a blade clamped thereagainst will be generally bisected by such radius, together with a clamp block mounted with said saw bar over at least a portion of said groove, said clamp block having a first generally cylindrical aperture therethrough, a major portion of said aperture being generally circular and complementary to said end portion of said saw bar, the remaining portion of said aperture comprising a generally rectangular groove, one wall of which is disposed in general alignment with said first wall of said saw bar, the opposite wall of said rectangular groove intersecting said second wall of said saw bar generally perpendicular thereto, said one wall and said other wall being spaced apart at least the thickness of the blade shank, together with first and second fastening means, said first fastening means securing said clamp block with said saw bar and said second fastening means replaceably securing a saw blade, or the like, within said aperture.

6. Saw bar and blade chuck defined in claim 5 wherein said saw bar is fabricated of a hard material having the characteristics of steel, said clamp block is fabricated of a light material having the characteristics of magnesium, and said blade clamping means comprises a transverse threaded aperture in said clamping means intersecting said rectangular groove opposite said first wall of said saw bar groove and a set screw threaded therein whereby the saw blade is clamped between said first wall, said second wall, and said set screw.

7. Saw bar and blade chuck defined in claim 6 wherein said lamp block fastening means comprises a transverse press fit pin.

8. Saw bar and blade chuck defined in claim 7 wherein said saw bar is substantially hollow and of low mass.

* * * * *